United States Patent
Frenn

(10) Patent No.: US 10,718,724 B2
(45) Date of Patent: Jul. 21, 2020

(54) SYSTEMS AND METHODS OF COMPARATIVE COMPUTED TOMOGRAPHY (CT) FOR QUALIFICATION OF COMMERCIAL GRADE ITEMS

(71) Applicant: Jon M Frenn, Hawthorn Woods, IL (US)

(72) Inventor: Jon M Frenn, Hawthorn Woods, IL (US)

(*) Notice: Subject to any disclaimer, the term of this patent is extended or adjusted under 35 U.S.C. 154(b) by 26 days.

(21) Appl. No.: 16/182,467

(22) Filed: Nov. 6, 2018

(65) Prior Publication Data

US 2020/0141883 A1    May 7, 2020

(51) Int. Cl.
  *G06K 9/00*   (2006.01)
  *G01N 23/046*   (2018.01)
  *G06T 11/00*   (2006.01)

(52) U.S. Cl.
  CPC ......... *G01N 23/046* (2013.01); *G06T 11/008* (2013.01); *G01N 2223/1016* (2013.01); *G01N 2223/302* (2013.01); *G01N 2223/419* (2013.01)

(58) Field of Classification Search
  None
  See application file for complete search history.

(56) References Cited

U.S. PATENT DOCUMENTS

| | | | |
|---|---|---|---|
| 7,773,725 B2 | 8/2010 | Gordon, III et al. | |
| 9,770,221 B1 | 9/2017 | O'Donnell | |
| 9,778,211 B2 | 10/2017 | Tsuyuki et al. | |
| 2004/0165760 A1* | 8/2004 | Veneruso | G06T 7/0004 382/141 |
| 2016/0224017 A1* | 8/2016 | Huang | B22F 3/1055 |
| 2017/0242955 A1* | 8/2017 | Ono | H01L 21/00 |

OTHER PUBLICATIONS

Martz, Harry Jr., et al., "X-ray Imaging: Fundamentals, Industrial Techniques and Applications," 2017.

* cited by examiner

*Primary Examiner* — Atiba O Fitzpatrick

(57) ABSTRACT

A method of qualifying physical components using computed tomography (CT) includes obtaining qualified CT data from a CT scanner for at least one qualified physical component. Qualification data is generated based on the qualified CT data, where the qualification data defines a qualification envelope. Candidate CT data is obtained from the CT scanner for a candidate physical component. Comparison data is then generated based on the candidate CT data and the qualification data, where the comparison data indicates whether the candidate CT data is within the qualification envelope defined by the qualification data. An acceptance signal is generated if the comparison data meets acceptance criteria.

20 Claims, 15 Drawing Sheets

SYSTEMS AND METHODS OF COMPARATIVE COMPUTED TOMOGRAPHY (CT) FOR QUALIFICATION OF COMMERCIAL GRADE ITEMS

CROSS-REFERENCE TO RELATED APPLICATIONS AND PRIORITY CLAIM

This application claims priority to U.S. Provisional Patent Application No. 62/584,846 filed Nov. 12, 2017 and entitled "Use of comparative computed tomography (CT) for qualification of commercial grade items," which is incorporated by reference into this application in its entirety

FIELD

The disclosure is directed to the field of single-energy and dual-energy Computed Tomography (CT). More specifically, the disclosure is directed to using to single-energy and dual-energy CT for industrial inspection and qualification.

BACKGROUND

Traditionally, industrial CT scanning is used for non-destructive examination (NDE). In the past, CT scanning was used to examine the internal configuration and condition of nuclear power plant components and their internal parts. This work was performed on behalf of nuclear utilities and other industries requiring high-reliability. For example, traditional CT scanning was performed to identify condition and configuration of power plant components and to attempt to identify internal non-metallic parts within sealed components.

Many highly regulated, technical industries require an enhanced degree of reliability for the component parts that are integrated into the devices and/or systems that operate within those industries. This reliability requirement is taken very seriously because a part, component or system failure could result in loss of life or a significant risk to the health and safety of employees and the public. Typically, item quality (and its reliability) is ensured by establishing detailed specifications representing the item design requirements and through implementation of very rigorous Quality Assurance and Quality Control (QA/QC) Programs. This approach has been effective at producing very reliable parts, components and systems, however, it comes with the downside of being slow, costly and requiring extensive documentation. In addition, it results in a limitation on the number of suppliers who can meet all of the requirements to produce a qualified item.

For the industries that require a specially qualified inventory of spare parts, manufactured and tested to the requirements of technical specifications and an approved quality program, there is typically a long lead time required to acquire those parts. This causes the users to maintain an extensive, on-hand, qualified, inventory to meet operational needs.

SUMMARY

This disclosure describes a rigorous comparative CT process that will provide physical component qualification equivalent to components more traditionally qualified by technical specification, testing and implementation of quality program requirements. The disclosure relates to using CT to scan a representative sample of the existing, already accepted inventory of qualified items to obtain dimensional and materials information from those items. The electronic files from those scans will be used to identify a range of dimensional acceptability in all orientations, and the identification of the material (or materials) that the item is made of.

The scan data from representative samples will be used to construct electronic baseline files for each class of items. These baseline files are used similarly to a mechanical go/no-go gage for qualifying components, as will be understood by those skilled in the art. Once these go/no-go baseline files are prepared, subsequent commercial grade items can be CT scanned and their dimensional and materials data can be compared to the established go/no-go baseline. If it can be confirmed that scan data from a subsequent item meets the requirements of the sample baseline, that item can be designated as equivalent to the previously scanned baseline items that were procured to the requirements of the quality program and in compliance to the item's specification. The subsequent scanned items can then be used for the same applications as the qualified baseline. The electronic CT scan record, comparing to the already qualified baseline, provides the assurance of subsequent item quality and reliability.

In one example, the system for qualifying physical components using CT will include 1) a CT scanner; 2) a jig for positioning the physical component on the CT scanner; 3) a processor operatively connected to the CT scanner; and 4) non-transient memory, operatively connected to the processor, that includes instructions for comparing the three-dimensional and materials CT scan information for the purpose of determining likeness.

In one example, the CT scan comparison is accomplished by 1) performing a CT scan of at least one qualified physical component; 2) establishing a qualification envelope from the scan data of the already qualified physical component: 3) performing a CT scan for a candidate physical component; 4) comparing data based on the candidate CT data and the qualification data to determine whether the candidate CT data is within the qualification envelope defined by the qualification data; and 5) generating an acceptance signal if the comparison data meets acceptance criteria.

In an example, the qualification envelope may be influenced by: 1) the accuracy of positioning the physical component in the CT scanner; 2) the resolution and repeatability of the CT scanner and CT data; 3) a degree of conservatism assigned to meet qualification process requirements of the candidate physical component's end user; and 4) generating an ordered list and eliminating a subset of the ordered list of recorded measurements from the plurality of components for each volumetric pixel (voxel). In an example, the subset eliminated may be based on a conservatism factor.

In an example, an acceptance criteria for determining likeness of the candidate physical component to the qualified physical component(s) may require that every voxel of the candidate CT data is within the qualification envelope defined for that voxel by the qualification data where: 1) the qualified CT data includes a plurality of volumetric pixels (voxels); 2) the qualification data includes a plurality of voxels; 3) candidate CT data includes a plurality of voxels; and 4) the comparison data includes a plurality of voxels. Each voxel includes three-dimensional (3D) location and material information. The material information may include density information based on radiopacity, and effective-atomic number ($Z_{eff}$) derived from scanning at multiple energy levels.

Throughout this application, the terms "parts" and "components" are used to refer to the items that are being scanned. Simple components may only be comprised of a single part. More complex components are typically comprised of many parts.

Throughout this application, the term "commercial grade" is used to refer to items that are generally available to the commercial market. They may or may not be manufactured to rigorous specifications or quality programs requirements.

Throughout this application, the term "qualified" is used to refer to special application items which are manufactured to rigorous specifications or quality programs requirements. It also refers to the process of providing an equivalent level of item technical adequacy and quality assurance that is ensured through this process of comparative CT.

Figure 1:
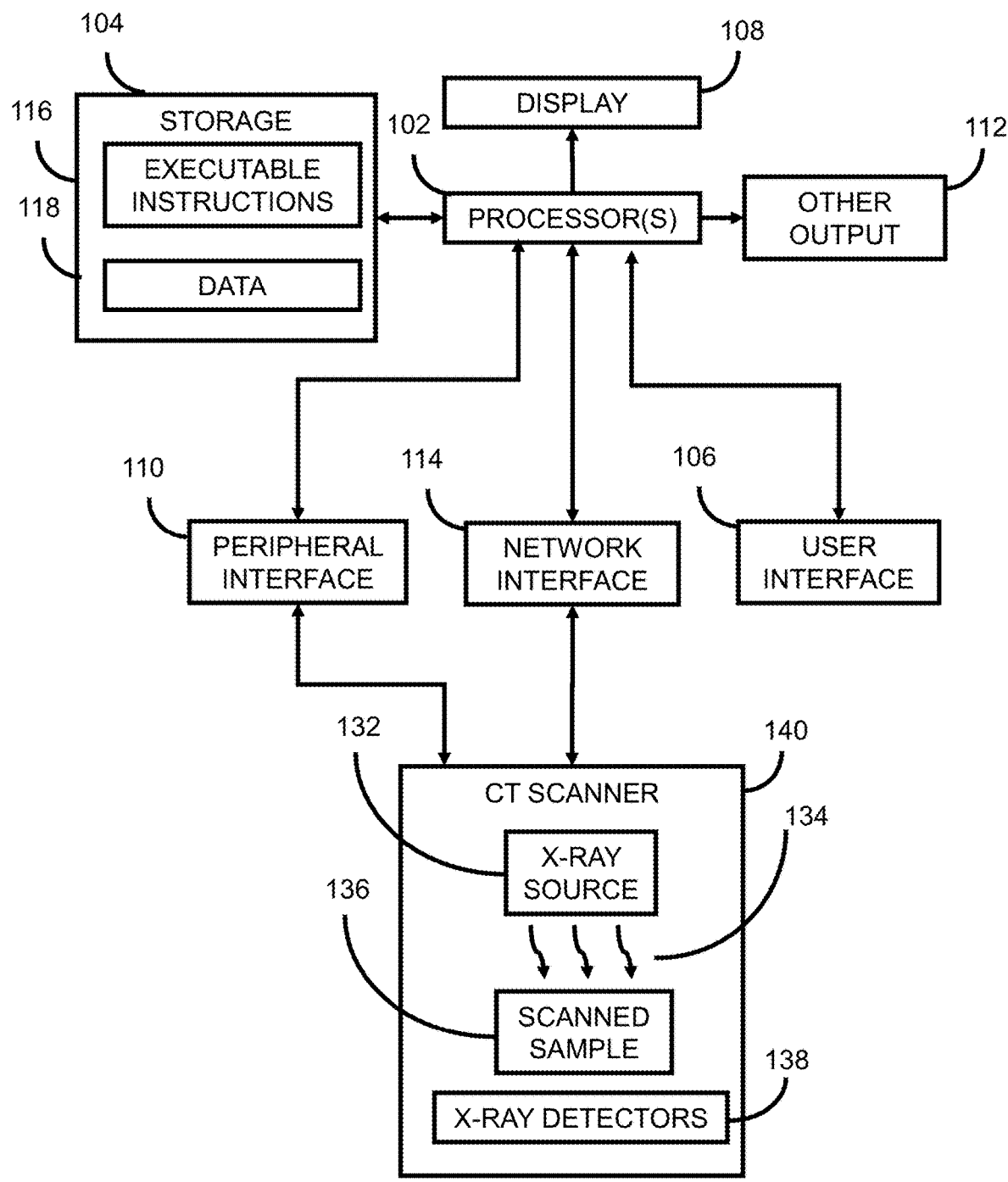
FIG. 1 is a block diagram of an example of the disclosed CT system illustrating its basic components and the relationships between them, in accordance with the present disclosure.

Although the above drawings are provided to provide a conceptual representation of the CT scanned part and its evaluation against the qualification data, this process does NOT require generation of a visual representation of the part, or of the qualification data developed from the sampling of qualified parts. The comparison of the commercial grade items to the qualified baseline parts of the qualification data is made using the electronic files developed from the CT scans, in accordance with the present disclosure.

Detailed dimensional and materials properties of a particular portion or sub-part of a component to be qualified can be extracted from the CT scan data if an investigation of an out-of-tolerance criteria is desired, however, this process is intended primarily for a production line type acceptance/rejection decision on qualification of commercial grade parts for qualified applications, in accordance with the present disclosure.

DETAILED DESCRIPTION

Any example description of x-ray CT scanning equipment or CT scanning processes included with this disclosure are for general information purposes only, since the actual equipment and processes used will be selected to optimize their effectiveness for the composition and complexity of the items subjected to this comparative CT process.

This method of comparative CT scanning is intended to result in a ACCEPT/REJECT DECISION for qualification of commercial grade items to be used in applications requiring qualified components. Additional method steps may be performed to resolve the reason a part was rejected. However, such an effort complicates the process, increases costs and reduces its efficiency. Having faster access to qualified, replacement parts is expected to result in a need for smaller inventories. Commercial suppliers that were not previously suppliers to the highly regulated industries will be able to prove their product(s) can be documented as being fit for qualified applications. The electronic comparison CT files will provide a comprehensive record of product quality. CT-qualified parts and components are expected to be less costly than the traditionally-qualified versions, even with the cost of the CT-qualification added to the commercial item cost.

Likely Users:

Likely users are industries that require high reliability and rigorous quality standards for their spare parts and components—particularly industries where operational safety is extremely important to the product users, facility staff and local community. Examples include:

Commercial Nuclear Power

Commercial Aviation

Military Equipment (Aviation, Naval, Ground)

Space (Communications, Exploration, Manned)
Medical Devices
Pharmaceuticals Processing
Hazardous Waste (Radioactive/Chemical/Biological)
Safety Equipment (Fire Protection/Explosive/High Pressure/Electrical)
Other highly regulated industries The industrial CT, used in this disclosure as the mechanism to establish likeness of commercial grade and qualified parts, is a next step refinement beyond x-ray, digital radiography used to perform two-dimensionally, visual examinations of components or items. The two-dimensional projection provides images that include artifacts from materials around the plane of interest. CT scans use many radiographic projections at different angles to lessen this ambiguity. The CT scanner generates a series of two-dimensional (2D) "slices" of a scanned object from multiple angles and, normally, multiple elevations. The CT software then reconstructs these "slices" to produces a mathematically accurate 3D reconstruction of a physical component that can be examined on various planes. The 3D reconstruction includes an array of data points representing volumetric pixels (voxel). Just as a 2D image is made from a map of pixels, where each pixel defines a 2D location and a color, each voxel in the 3D reconstruction created by the CT defines a 3D position and material information for that location.

Because this disclosure relates to comparing CT scan data from components being evaluated for likeness, a reliable and consistent calibration of the CT scanner is essential. Control of the scanning process, scan repeatability, and the accuracy of the calibration standards are all important to ensuring a valid comparison of CT scan data.

A wide variety of CT scanner configurations and source/detector combinations are available for getting the best possible results from scans of a wide variety of physical components. Selection of an optimized scanner considers the size and density of the item being scanned, ability to achieve adequate resolution and to address manufacturing tolerances, and being able to distinguish between multiple materials in the scan.

Dual-energy scanning, at low energy (20-200 keV) or high energy (2-9 MeV) can be used to calculate effective-atomic number ($Z_{eff}$) of material being scanned. The two energy levels chosen is often a function of the available CT scanner source and detector. In both low and high energy applications, the basis for measurement of the material composition comes from changes in the relative proportions of the different attenuation mechanisms, which constitute the total attenuation of the physical component.

Referring now to the Figures, in which like reference numerals represent like parts, various embodiments of the computing devices and methods will be disclosed in detail. FIG. 1 is a block diagram illustrating one example of a CT scanning system 100 suitable for use in generating, comparing and, when necessary, visualizing x-ray scan data.

FIG. 1 illustrates a representative x-ray scanning system 100 that may be used to implement the teachings of the instant disclosure. The system 100 may be used to implement, for example, one or more steps of the method illustrated in FIGS. 2-5, as described in greater detail below. The system 100 includes one or more processors 102 operatively connected to a storage component 104. The storage component 104, in turn, includes stored executable instructions 116 and data 118. In an embodiment, the processor(s) 102 may include one or more of a microprocessor, microcontroller, digital signal processor, co-processor or the like or combinations thereof capable of executing the stored instructions 116 and operating upon the stored data 118. Likewise, the storage component 104 may include one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, flash memory, etc. Processor and storage arrangements of the types illustrated in FIG. 1 are well known to those having ordinary skill in the art. In one embodiment, the processing techniques described herein are implemented as a combination of executable instructions and data within the storage component 104.

As shown, the scanning system 100 may include one or more user input devices 106, a display 108, a peripheral interface 110, other output devices 112, and a network interface 114 in communication with the processor(s) 102. The user interface 106 may include any mechanism for providing user input to the processor(s) 102. For example, the user interface 106 may include a keyboard, a mouse, a touch screen, microphone and suitable voice recognition application, or any other means whereby a user of the system 100 may provide input data to the processor(s) 102. The display 108 may include any conventional display mechanism such as a cathode ray tube (CRT), flat panel display, projector, or any other display mechanism known to those having ordinary skill in the art. In an embodiment, the display 108, in conjunction with suitable stored instructions 116, may be used to implement a graphical user interface. Implementation of a graphical user interface in this manner is well known to those having ordinary skill in the art. The peripheral interface 110 may include the hardware, firmware and/or software necessary for communication with various peripheral devices, such as media drives (e.g., magnetic disk, solid state, or optical disk drives), other processing devices, or any other input source used in connection with the instant techniques. For example, the peripheral interface may be a Universal Serial Bus (USB). Likewise, the other output device(s) 112 may optionally include similar media drive mechanisms, other processing devices, or other output destinations capable of providing information to a user of the device 100, such as speakers, LEDs, tactile outputs, etc. Finally, the network interface 114 may include hardware, firmware, and/or software that allows the processor(s) 102 to communicate with other devices via wired or wireless networks, whether local or wide area, private or public, as known in the art. For example, such networks may include the World Wide Web or Internet, or private enterprise networks, as known in the art.

The scanning system also includes a CT scanner 130 which is connected to the processor(s), 102 for example via the network interface 114 and/or the peripheral interface 110. The CT scanner 130 includes an X-ray source 132. The X-ray source 132 projects X-ray 134 which pass through a scanned sample 136 and are detected by X-ray detectors 138, as will be understood by those skilled in the art. A number of different X-ray source types and arrangements, X-ray detection devices and arrangements, and sample support arrangements are known to those skilled in the art and can be used in conjunction with the systems and methods described in this disclosure While the scanning system 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the system 100 may include a greater or lesser number of components than those illustrated. Once again, those of ordinary skill in the art will appreciate the wide number of variations that may be used is this manner. Further still, although a single scanning system 100 is illustrated in FIG. 1, it is understood that a combination of such computing devices may be configured to operate in conjunction (for example, using known networking techniques) to implement the teachings of the instant disclosure.

Figure 2:
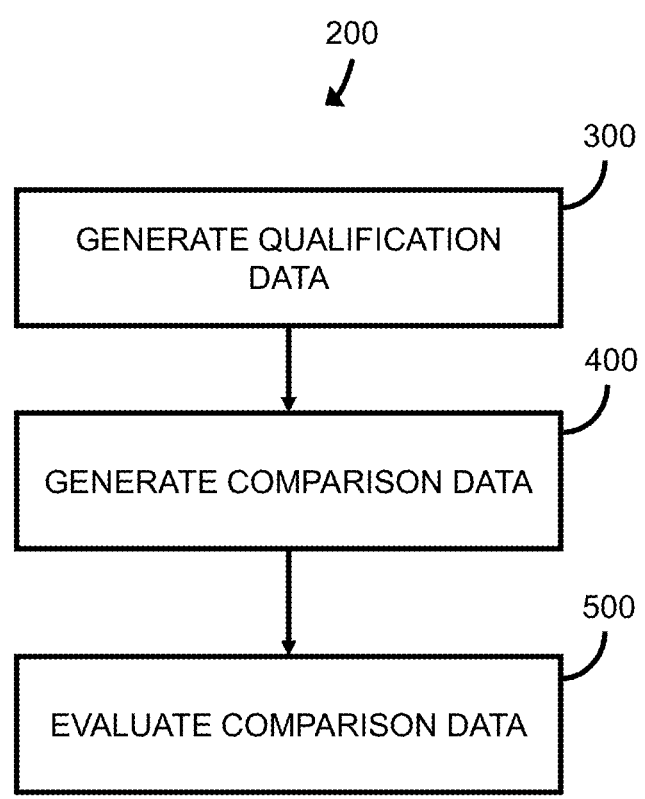
FIG. 2 is a flow chart illustrating an example process for qualifying commercial-grade components for use in applications requiring qualified-grade components.
Figure 3:
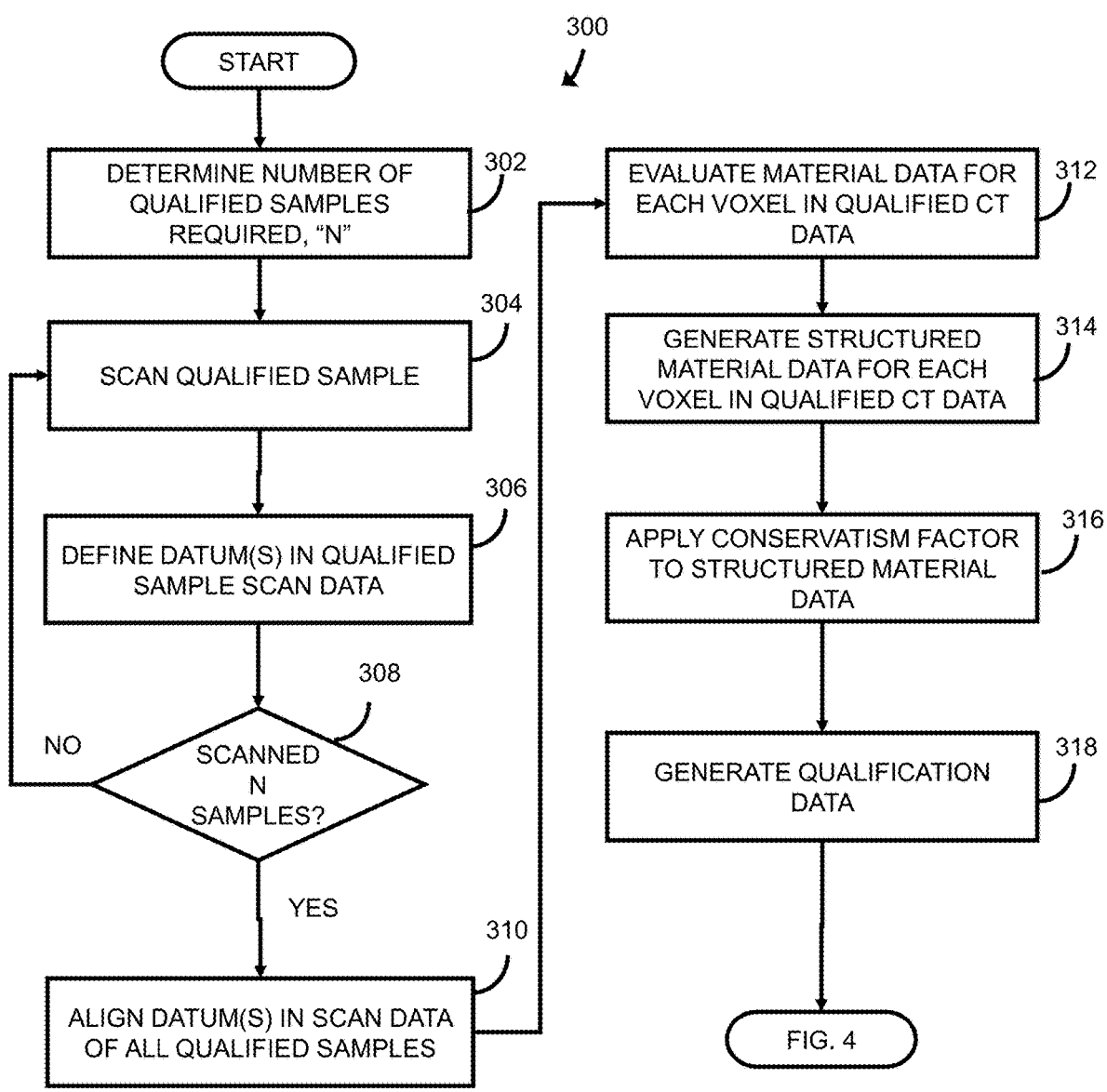
FIG. 3 is a flow chart illustrating an example process for generating qualification data, in accordance with the present disclosure.

FIG. 2 illustrates an example process 200 for qualifying commercial-grade components for use in applications requiring qualified-grade components. Process 200 includes generating qualification data 300 based on one or more pre-qualified physical components, generating comparison data 400, and evaluating the comparison data 500. These steps are illustrated in greater detail in FIGS. 3-5. FIG. 3 illustrates an example process 300 for generating qualification data based on one or more pre-qualified physical components. At 302 a required number of qualified sample components to be scanned is determined. The number of samples may be determined by an appropriate statistical method based on the precision and confidence interval required for the final application. For example, commercial nuclear applications may use the guidance of NCIG-09, Selective Inspection Process (incorporated by reference) to determine appropriate sample sizes. Other application may use similar methods prescribed by the industry or government regulations.

At 304 a qualified physical component is scanned using the CT scanner. As discussed above the scanner will generate qualified CT data, which is a digital file including an array of voxels. The information for each voxel describes its three-dimensional position relative to the other voxels and material information. When the CT scan is conducted at a single energy level (e.g. 20 keV) the material information will include only density information. If the CT scan is conducted at multiple energy levels, the material information will also include a calculated effective atomic number, $Z_{eff}$.

At 306, one or more datums may be identified in the qualified CT data. The datums can be used later to align the qualified data for multiple scans of qualified physical components to generate the final qualification data. Datums may help to ensure that each voxel in each scan is aligned as closely as possible with the corresponding voxel in other scans.

The types of datums and the methods for establishing them may be determined by the nature of the physical components and precision required by the application. In the simplest example, a datum may be merely a predetermine voxel within the array, which is essentially a point datum determined by the physical characteristics of the scanner. This could represent a point at the center of the detector space within the scanner or at an extreme edge of the detector space, for example the sample table. A slightly more sophisticated approach may introduce a radiopaque of known geometry and a know position within the detection space to define a datum or datums. For example, a radiopaque cylinder could be fixed vertically to the sample table to establish a vertical datum axis and a datum plane associate with the surface of the table. Similarly, a radiopaque cube could be fixed to the surface of the sample table to establish a system of orthogonal planes suitable for a Cartesian coordinate system.

In all of the examples above, consistent placement of the physical component relative to the datum(s) will be essential to accurately aligning the digital files for each scan. Consistent placement of the physical component can be enhanced by introducing fixtures to the scanner to hold the physical component consistently. In one example, the fixture may be present in the scanner during calibration, in which case the fixture will not appear within the digital file for a particular scan based on that calibration. In another example, the fixture may be introduced after calibration and would show up in the digital file. This may be desirable if the fixture is to be used to determine datums. In another example, a hybrid approach may be used, where the bulk of the fixture is present during calibration, but certain radiopaque elements are added for actual scans to assist in defining datums.

In another example, datums may be determined using the geometry of the physical components themselves. For example, if a component is cylindrical, the software could identify the cylinder and define an outer diameter, inner diameter, or axis as a datum. In one example, the software could used edge-detection techniques from machine-vision or character-recognition techniques to mathematically determine the boundaries of known geometric features within the component. These features could then be used to generate datums.

At 308 the software checks if the required number of scans of qualified physical components has been completed. At 310, the datums determined for each digital file are used to align the voxels in each file.

At 312 the X-ray scan data is evaluated for each voxel to determine the material data (density and/or effective atomic number, $Z_{eff}$), for each voxel in each scan. At 314 the material data for each voxel is then structured in an array. For example, density or $Z_{eff}$ data may be structured from highest to lowest. For example, see Table 1, below, where the left-hand column represents density data for a particular voxel in the order the readings were recorded. The center column represents the density information structured from highest to lowest density.

At 316 a conservatism factor is applied to the structured material data to determine a qualification envelope for each particular voxel. In the simplest example, the conservatism factor may apply a linear restriction to eliminate outliers. This example is illustrated in right-hand column Table 1. In this example, a linear 80% conservatism factor is employed, so the lowest 10% and highest 10% of density readings are eliminated. The upper and lower bounds of the remaining density reading represent the qualification envelope. Thus, any density reading between 0.0121 g/cm$^3$ and 7.85 g/cm$^3$ would be acceptable. This type of density profile may exist for voxels close to an edge of the physical component. Voxels always in the body of the part would have similar densities for every scan. Similarly, voxels always outside of the component would have consistently low densities (i.e. the density of air).

TABLE 1

| Voxel Density Reading g/cm$^3$ | | |
| --- | --- | --- |
| Initial | Structured | Qualification Envelope |
| 7.81 | 7.91 | |
| 7.79 | 7.85 | 7.85 |

TABLE 1-continued

| Voxel Density Reading g/cm³ | | |
|---|---|---|
| Initial | Structured | Qualification Envelope |
| .00123 | 7.84 | 7.84 |
| 7.85 | 7.81 | 7.81 |
| .00100 | 7.80 | 7.80 |
| 7.78 | 7.79 | 7.79 |
| 7.91 | 7.78 | 7.78 |
| .00121 | .00123 | .00123 |
| 7.80 | .00121 | .00121 |
| 7.84 | .00100 | |

Other approaches for applying a conservatism factor can also be applied. In one example, if the number of scans does not lend itself to a neat application of linear conservatism factor, linear extrapolation could be used. For example, if a conservatism factor of 90% was applied to the data in Table 1 instead of 80%, the number of data points would be inappropriate. Instead, the qualification envelope could be linearly interpolated between the two highest and lowest density readings. Using the data in Table 1, a 90% conservatism factor would "land" halfway between the two highest and lowest density readings, so the linearly interpolated qualification envelope would be 0.00111 to 7.88 g/cm³. Statistical methods could also be used. For example, the conservatism factor could be ±2 standard deviations, or a fixed ratio of the mean or median density measurement. All of the above techniques could also be applied to the effective atomic number.

Figure 4:
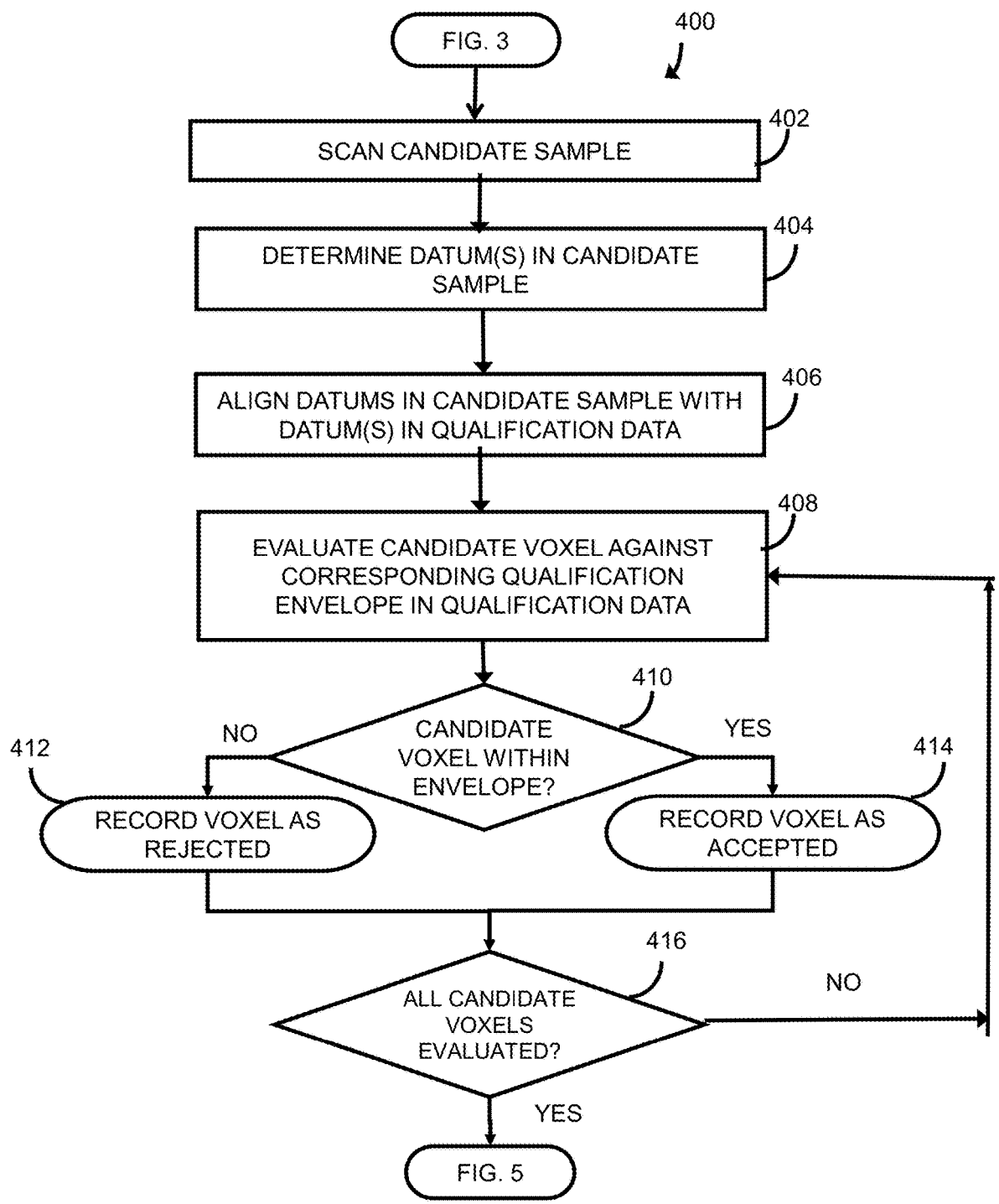
FIG. 4 is a flow chart illustrating an example process for evaluating a candidate component against qualification data, in accordance with the present disclosure.

FIG. 4 illustrates an example process 400 for evaluating a candidate component against qualification data generated according to FIG. 3. At 402 the physical component to be qualified—the candidate physical component—is scanned by the same CT scanner as the qualified components. The setup should be the same as what was used to scan the qualified components. This includes calibration, component placement and/or fixturing, and scanning energies.

In another example, different scanners may be used to scan the candidate components versus the qualified components. Multiple scanners could even be used to scan the qualified components. In this situation additional techniques would be required to remove artifacts particular to each scanner, as known to those skilled in the art. When a single scanner is used for all of the scans, the consistent artifacts peculiar to the machine will cancel themselves out when generating the qualification data and comparison data. This will not be the case if multiple scanners re used, for example when the scanners are separated by hundreds of miles. In these situations, the scanning artifacts must be removed for a valid comparison.

At 404 appropriate datums are identified in candidate part scan data to correspond to the datums in the qualified CT data and the qualification data. At 406 the datums in the candidate CT data are aligned with the datums in the qualification data.

At 408 the candidate CT data is evaluated against the qualification data on a voxel-by-voxel basis. At 410 the material data for the voxel in the candidate CT data is compared to the qualification envelope for the corresponding voxel in the qualification data to generate a comparison data file. At 412 the voxel being evaluated is recorded as rejected if the material data for the candidate voxel is not within the qualification envelope. At 414 the voxel being evaluated is recorded as accepted if the material data for the candidate voxel is within the qualification envelope. At 416 the comparison data file is evaluated to confirm that all of the voxels have been evaluated. If all of the voxels have been evaluated, the comparison data file is ready for evaluation.

Figure 5:
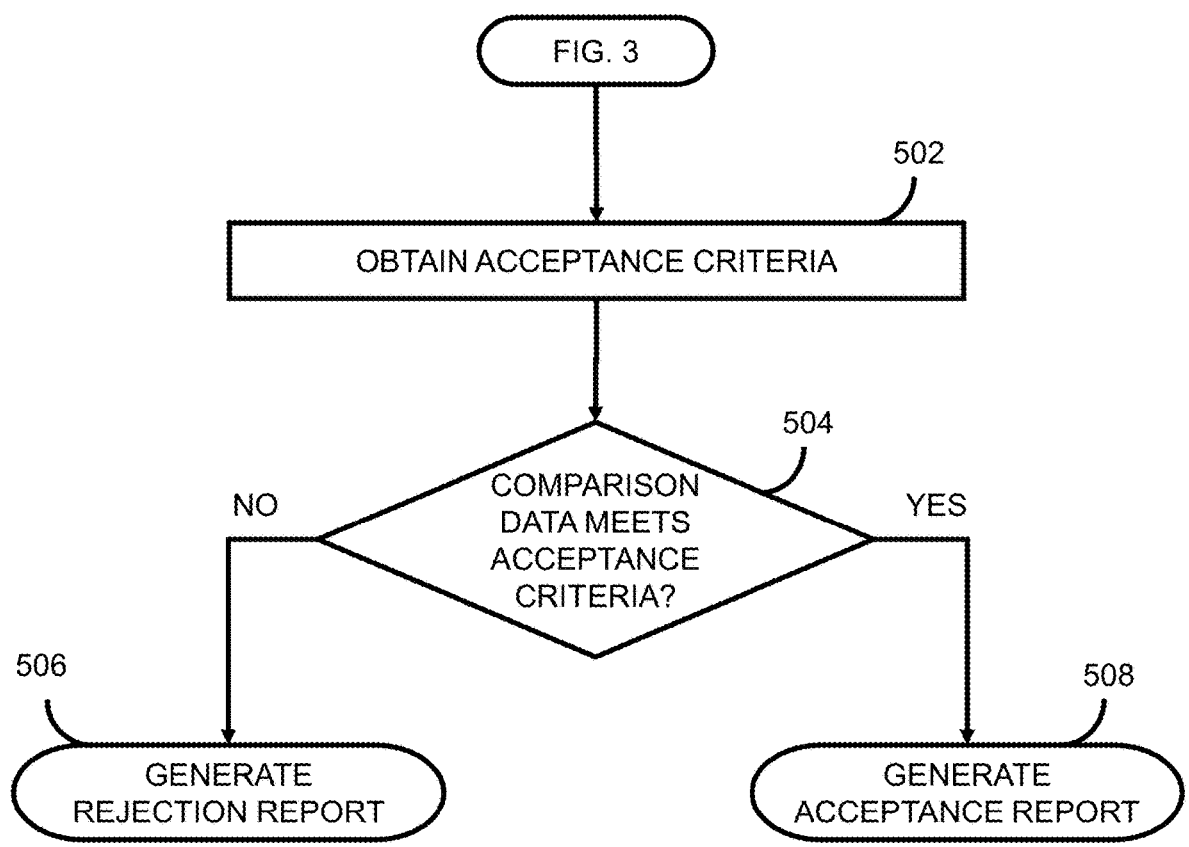
FIG. 5 is a flow chart illustrating an example process for evaluation the comparison data file for acceptance or rejection.

FIG. 5 illustrates an example process for evaluating the comparison data file for acceptance or rejection. At 502 the acceptance criteria is obtained. In one example, the acceptance criteria simply requires that the 100% of the voxels in the comparison data be accepted. In another example, the acceptance criteria may be a fixed percentage less than 100%. In another example, the percentage of voxels that must be accepted may depend on where they are located. For example, voxels in an area of the component know to be critical may require 100% acceptance while voxels outside the critical area may not require 100% acceptance. This may allow some forgiveness for potential errors in non-critical areas. Conversely, a lower acceptance percentage may be accepted in regions of the component known to have variable interfaces between sub-components. At 504 the comparison data file is evaluated to determine if the acceptance criteria is met. At 506 a rejection report is generated if the acceptance criteria is not met. At 508 an acceptance report is generated if the acceptance criteria is met.

Figure 6:
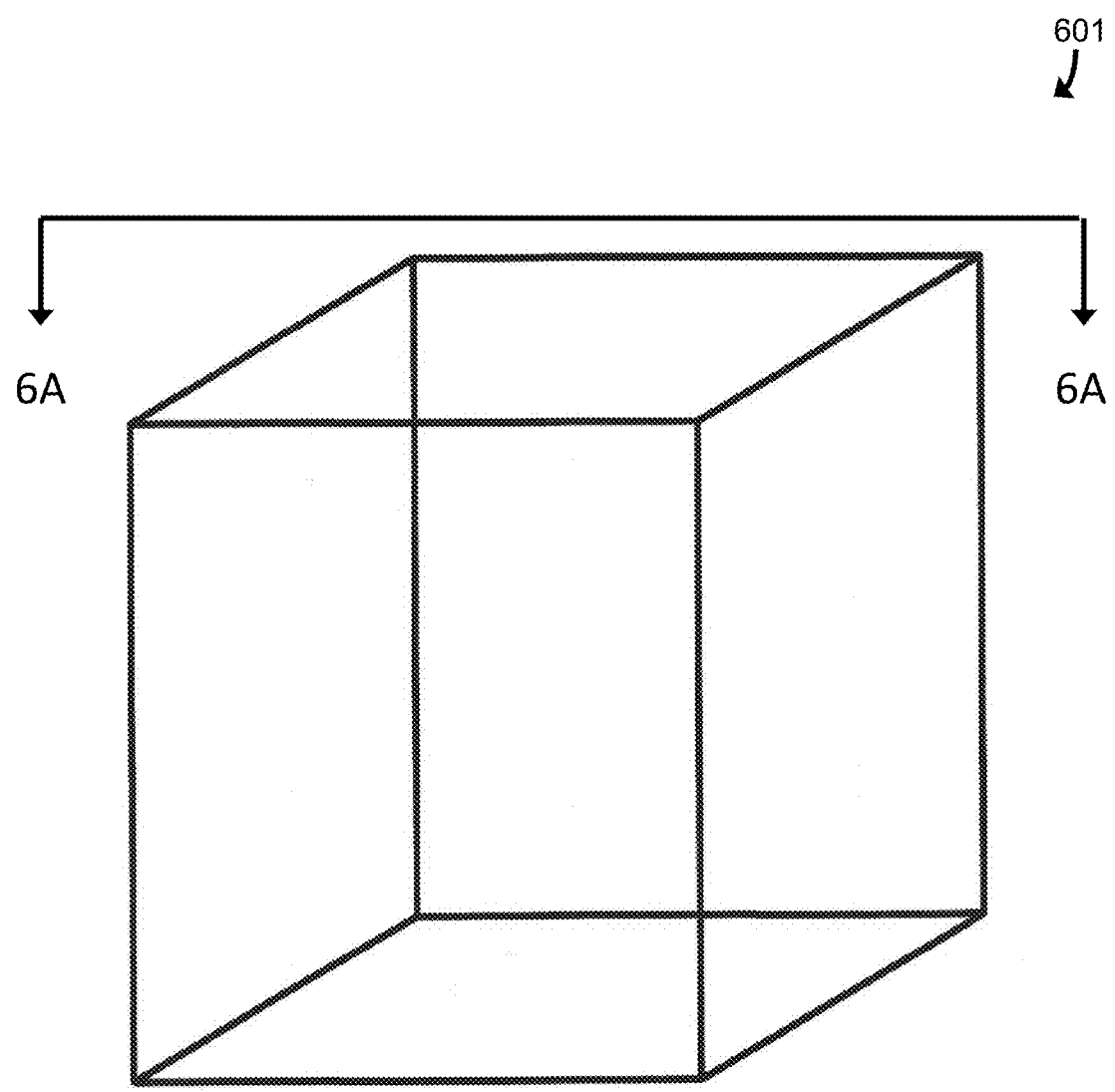
FIG. 6 is an isometric visualization of a CT-scanned baseline-qualified component file that will be generated by CT scanning, in accordance with the present disclosure.

FIG. 6 is an isometric visualization of a CT-scanned baseline-qualified component file 601 that might be generated by CT scanning. For illustration purposes, the baseline-qualified component file 601 represents a cube-shaped lattice of supports.

Figures 6A, 6B:
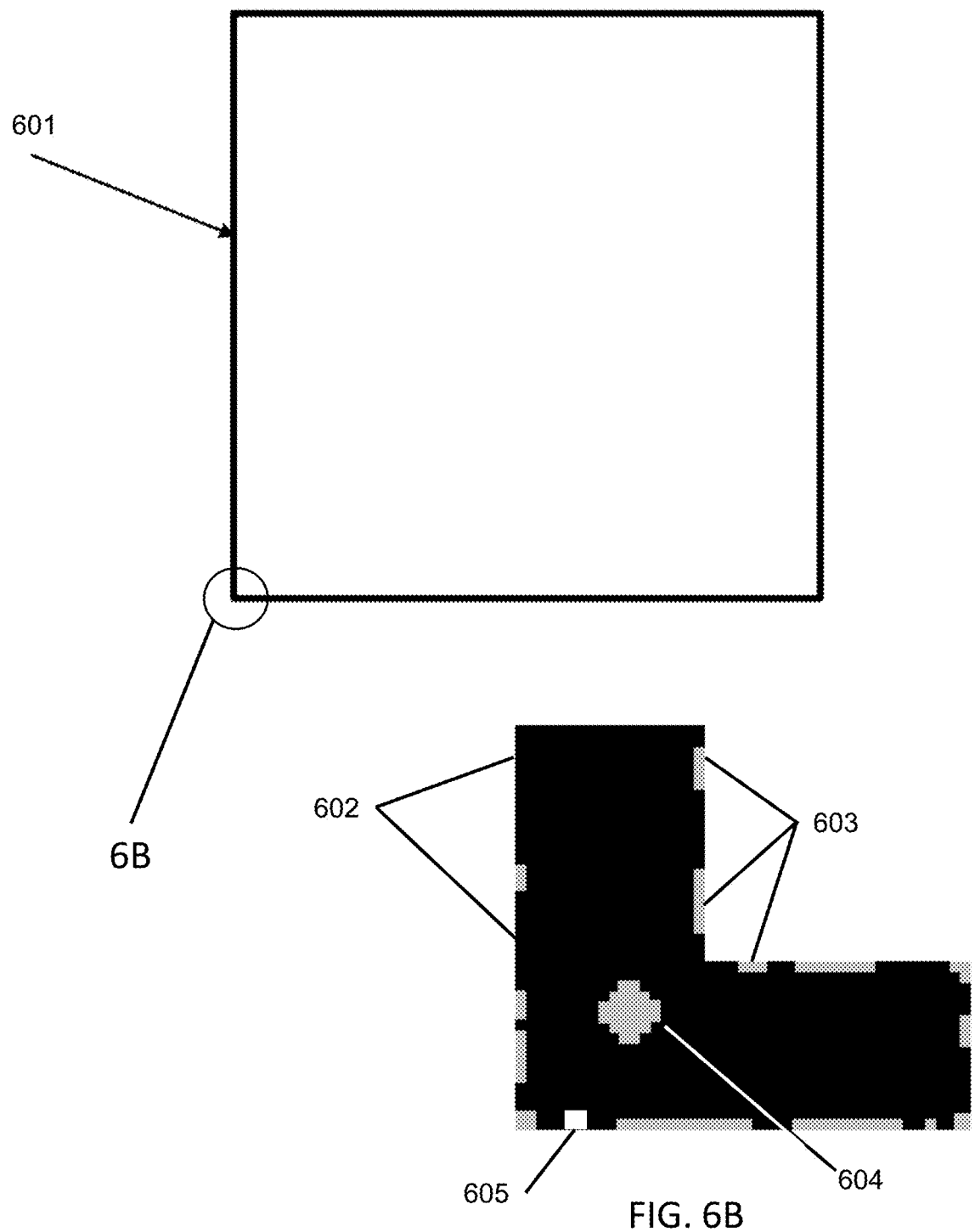
FIG. 6A is a visualization of a 2D cross-section of the CT-scanned baseline-qualified component file from FIG. 6, in accordance with the present disclosure.
FIG. 6B is a detailed visualization of a portion of the 2D cross-section of the CT-scanned baseline-qualified component file from FIG. 6A, illustrating individual voxels, in accordance with the present disclosure

FIG. 6A is a visualization of a 2D cross-section of the CT-scanned baseline-qualified component file from FIG. 6. Because of the lattice-like structure of the baseline-qualified component file 601, the cross-section appears similar to a plan view of file 601.

FIG. 6B is a detailed visualization of a portion of the 2D cross-section of the CT-scanned baseline-qualified component file from FIG. 6A, illustrating individual voxels. The black squares 602 represent voxels that include solid material in every scan. The gray squares 603, 604 represent voxels where some scans indicate solid material and other scans indicated air. Depending on the resolution of the scan and accuracy of the part placement and datums, this may represent and edge condition 603 or a void 604 in one of the scanned parts. The square at 605, and the other white space, represent voxels which always indicates an absence of solid material.

Figure 7:
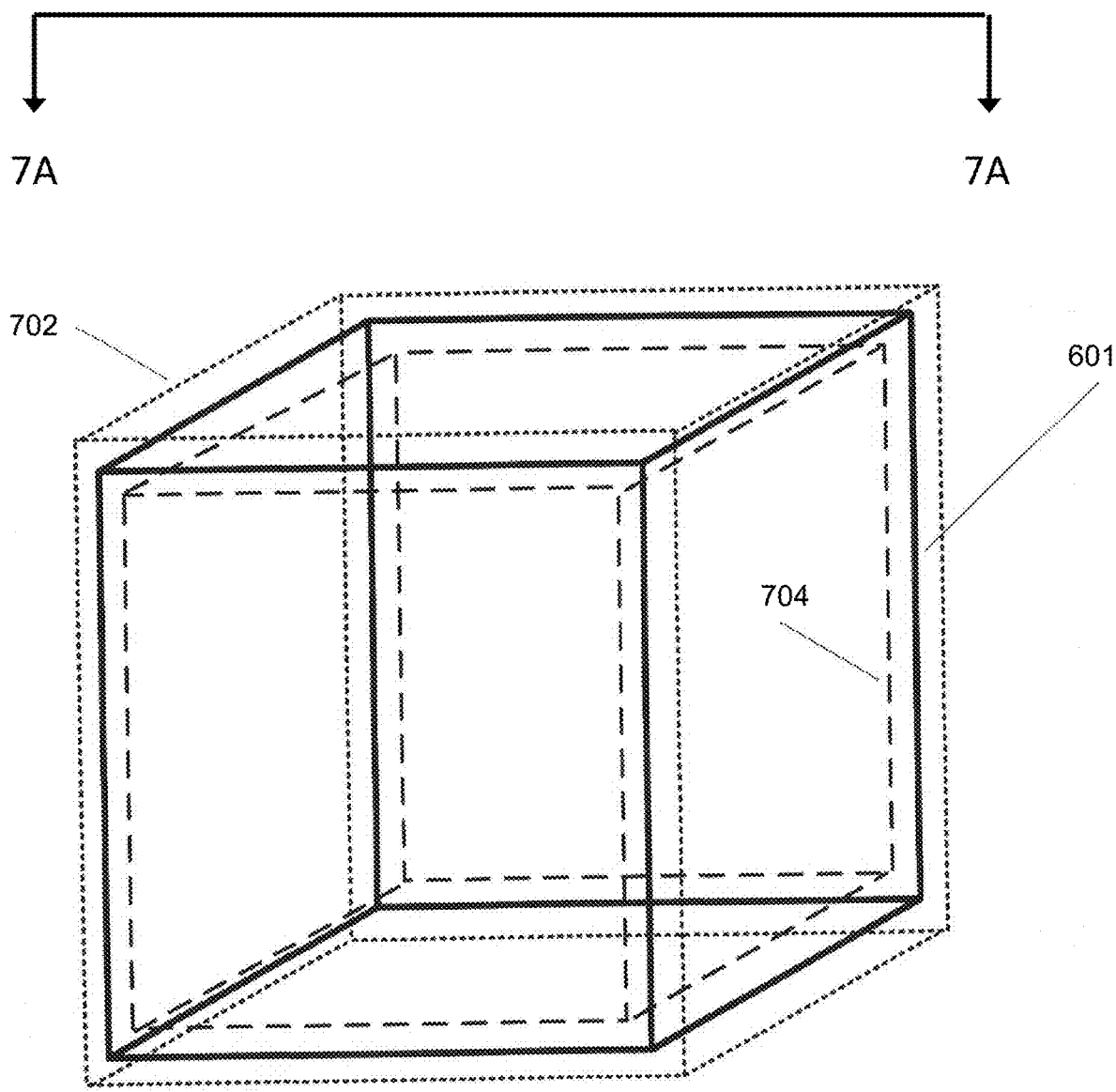
FIG. 7 is an isometric visualization of a range of dimensional and material properties from the combined data representing multiple CT-scans of baseline qualified components, in accordance with the present disclosure.

FIG. 7 is an isometric visualization of a range of dimensional and material properties from the combined data representing multiple CT-scans of baseline qualified components. The original baseline-qualified component file 601 is shown. Additional scans, for example of additional qualified components and/or re-scans for the same component result in a maximum material boundary 702 and a minimum material boundary 704.

Figure 7A:
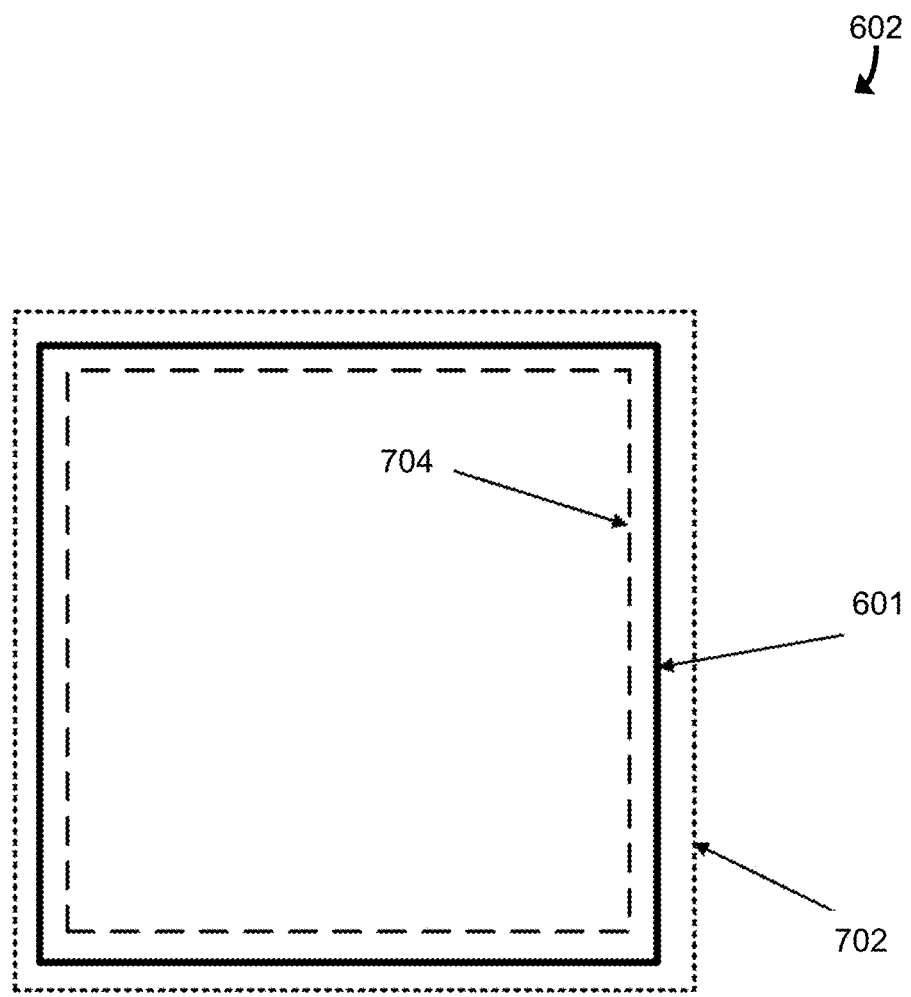
FIG. 7A is a visualization of a 2D cross-section of the range of dimensional and material properties from the combined data representing multiple CT-scans from FIG. 7, in accordance with the present disclosure.

FIG. 7A is a visualization of a 2D cross-section of the range of dimensional and material properties from the combined data representing multiple CT-scans from FIG. 7.

Figure 8:
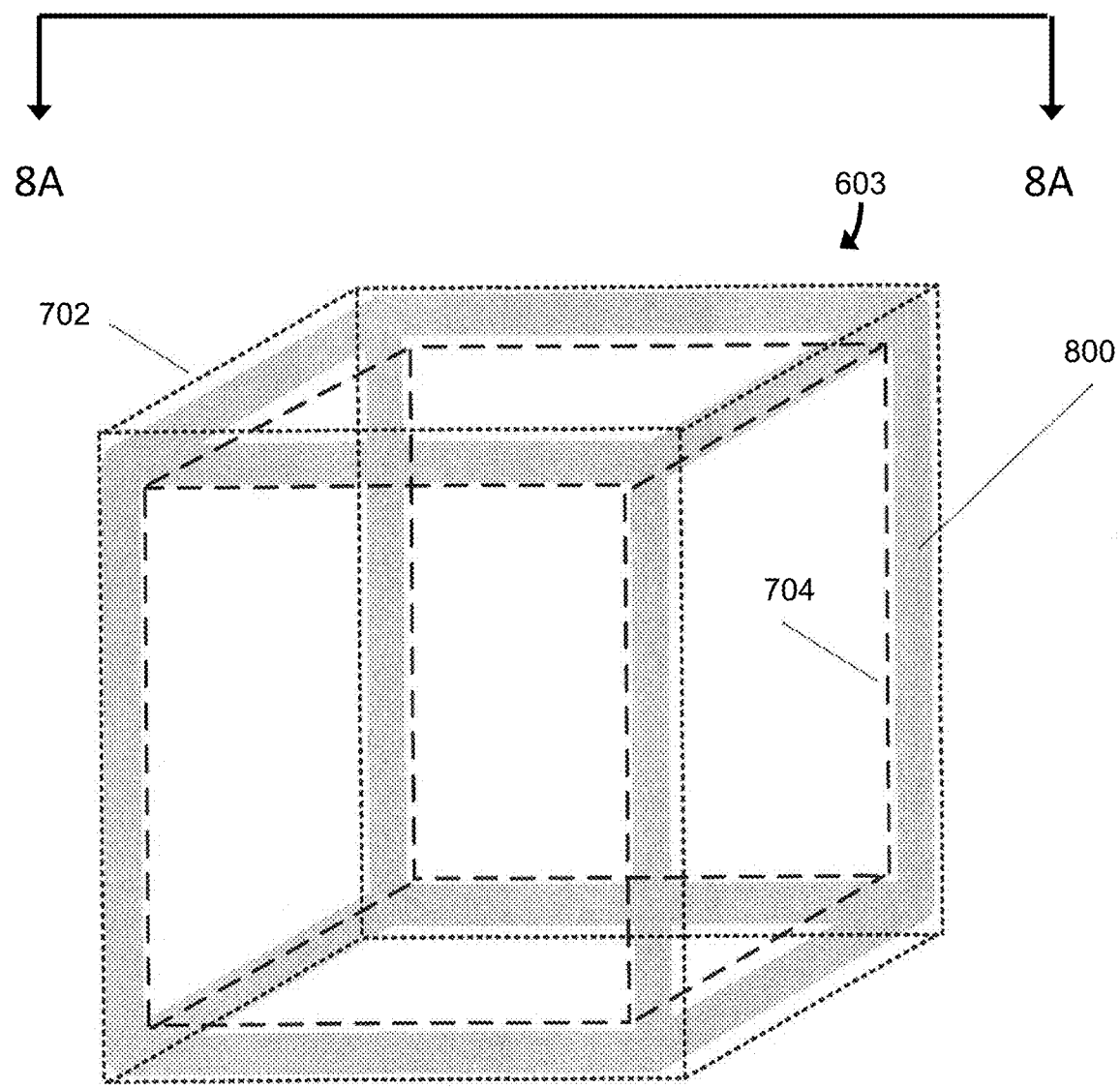
FIG. 8 is an isometric visualization of a conservative digital qualification data file, superimposed onto the actual measured range of baseline component properties. This figure illustrates a reduced range of components properties that may be used to establish qualification of each individual commercial grade part by documenting that it is conservatively bounded by the known properties of the baseline parts, in accordance with the present disclosure.

FIG. 8 is an isometric visualization of a conservative digital qualification data file, superimposed onto the actual measured range of baseline component properties. This figure illustrates a reduced range of components properties that may be used to establish qualification of each individual commercial grade part by documenting that it is conservatively bounded by the known properties of the baseline parts. The maximum material boundary 702 and a minimum material boundary 704 are again illustrated. The boundaries of the qualification data file 800 are also illustrated. These boundaries represent the application of the conservatism factor to the original maximum material boundary 702 and a minimum material boundary 704.

Figure 8A:
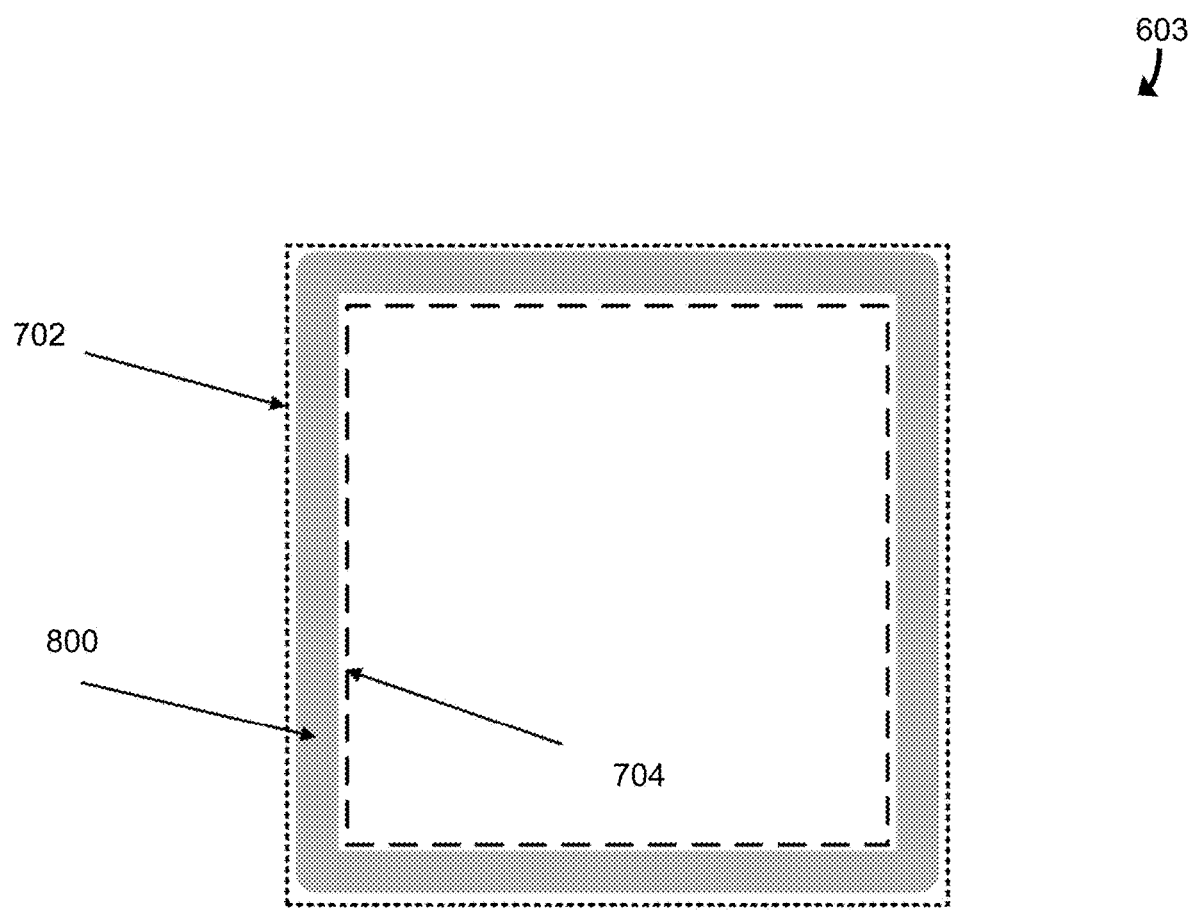
FIG. 8A is a visualization of a 2D cross-section of the conservative digital qualification data file, superimposed onto the actual measured range of baseline component properties.

FIG. 8A is a visualization of a 2D cross-section of the conservative digital qualification data file, superimposed onto the actual measured range of baseline component properties.

Figure 9:
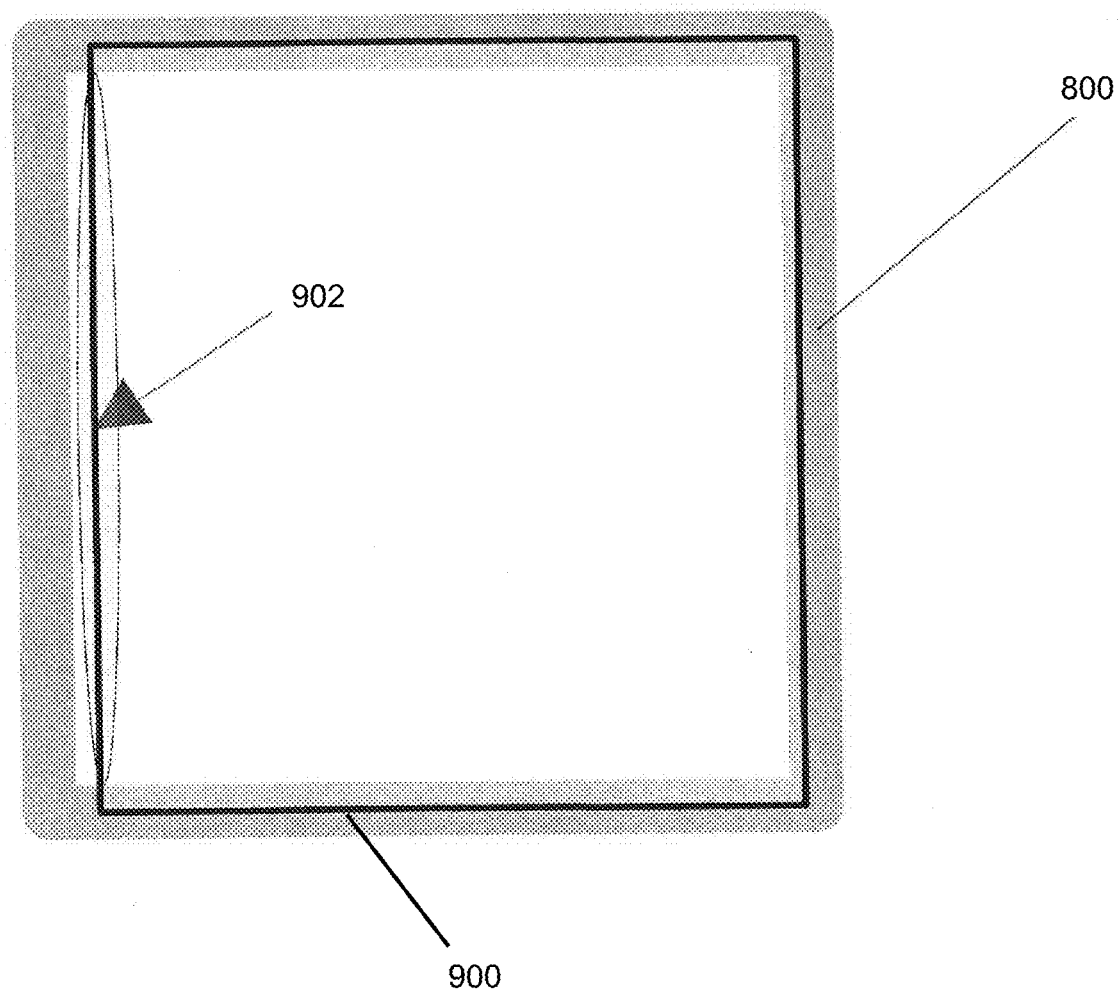
FIG. 9 is a cross-section view of a visualization of a CT-scanned candidate component superimposed on the digital qualification data illustrating failing properties of the candidate component compared to the qualification data, in accordance with the present disclosure.

FIG. 9 is a cross-section view of a visualization of a CT-scanned candidate component superimposed on the digital qualification data illustrating failing properties of the candidate component compared to the qualification data. The failing section 902 of the failing candidate component 900 is highlighted relative to the boundaries of the qualification data file 800.

Figure 10:
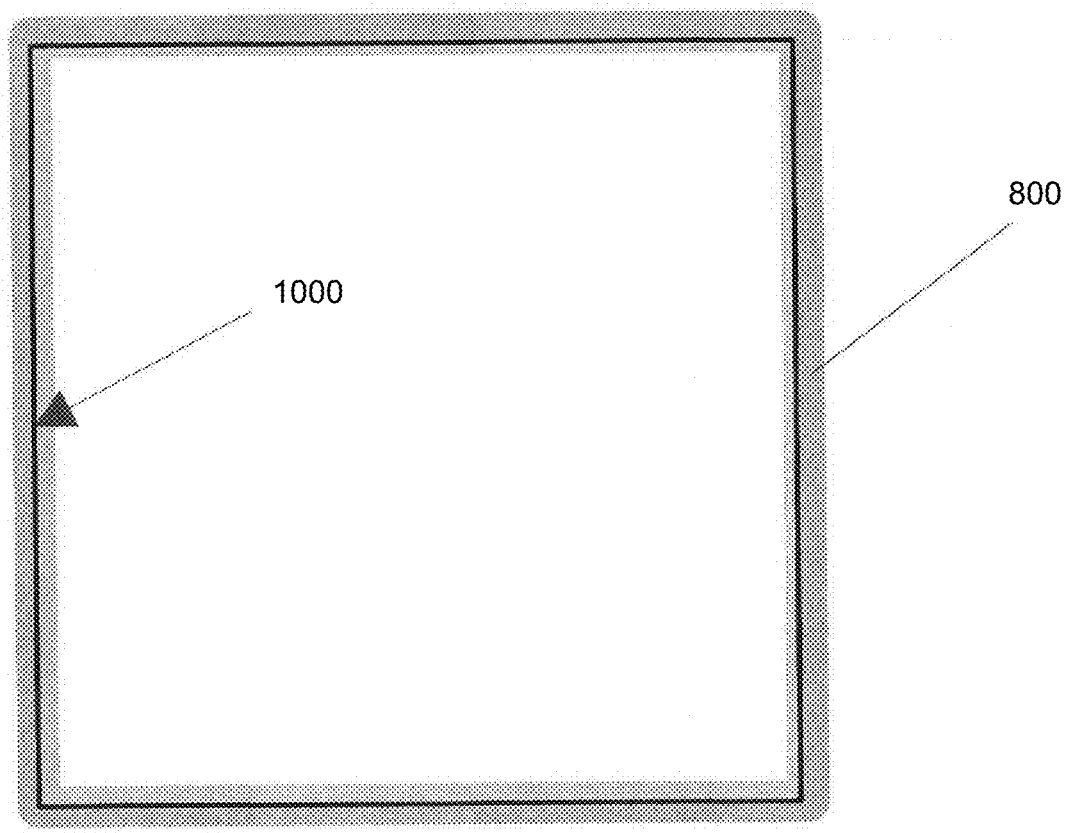
FIG. 10 is a cross-section view of a visualization of a CT-scanned candidate component superimposed on the digital qualification data illustrating passing properties of the candidate component compared to the qualification data, in accordance with the present disclosure.

FIG. 10 is a cross-section view of a visualization of a CT-scanned candidate component superimposed on the digital qualification data illustrating passing properties of the candidate component compared to the qualification data. As illustrated in the figure, the passing candidate component 1000 is entirely within the boundaries of the qualification data file 800.

Figure 11:
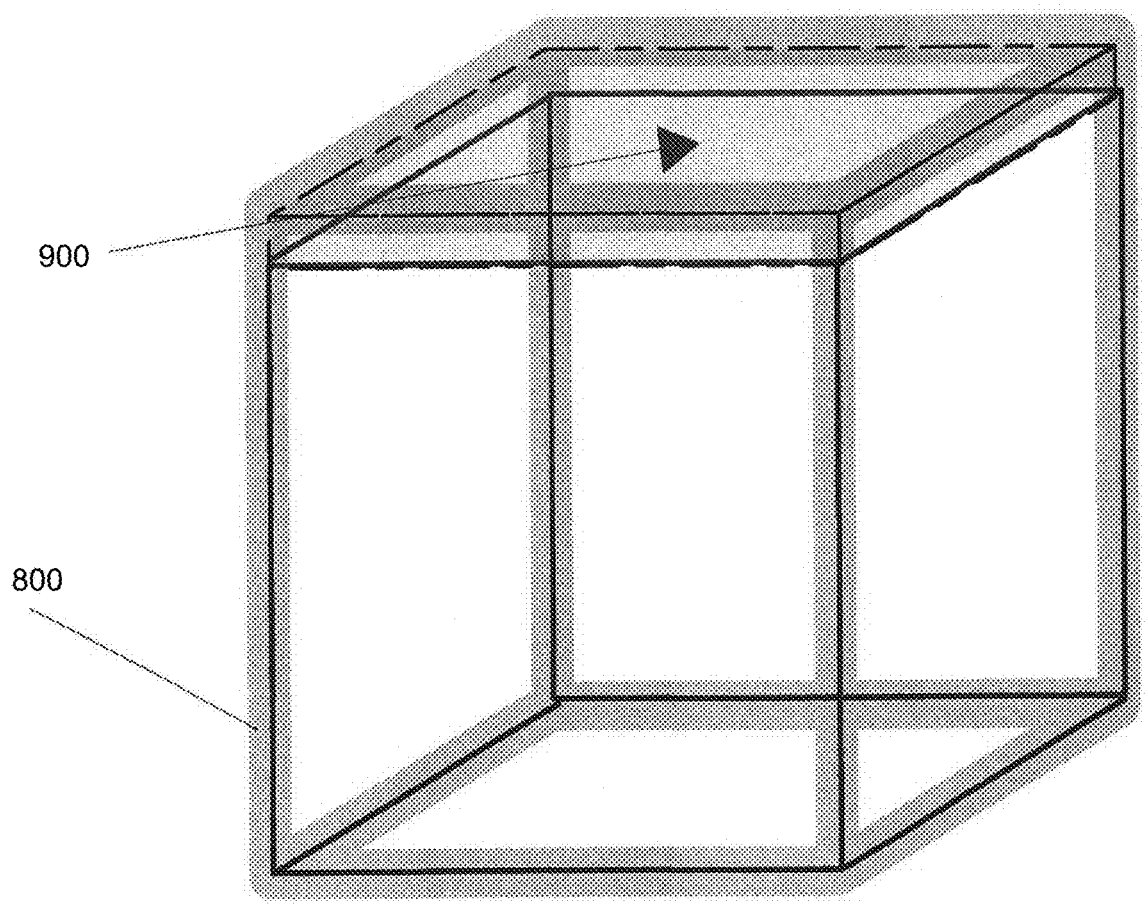
FIG. 11 is an isometric view of a visualization of a CT-scanned candidate component superimposed on the digital qualification data illustrating failing properties according to the qualification data, in accordance with the present disclosure.
Figure 12:
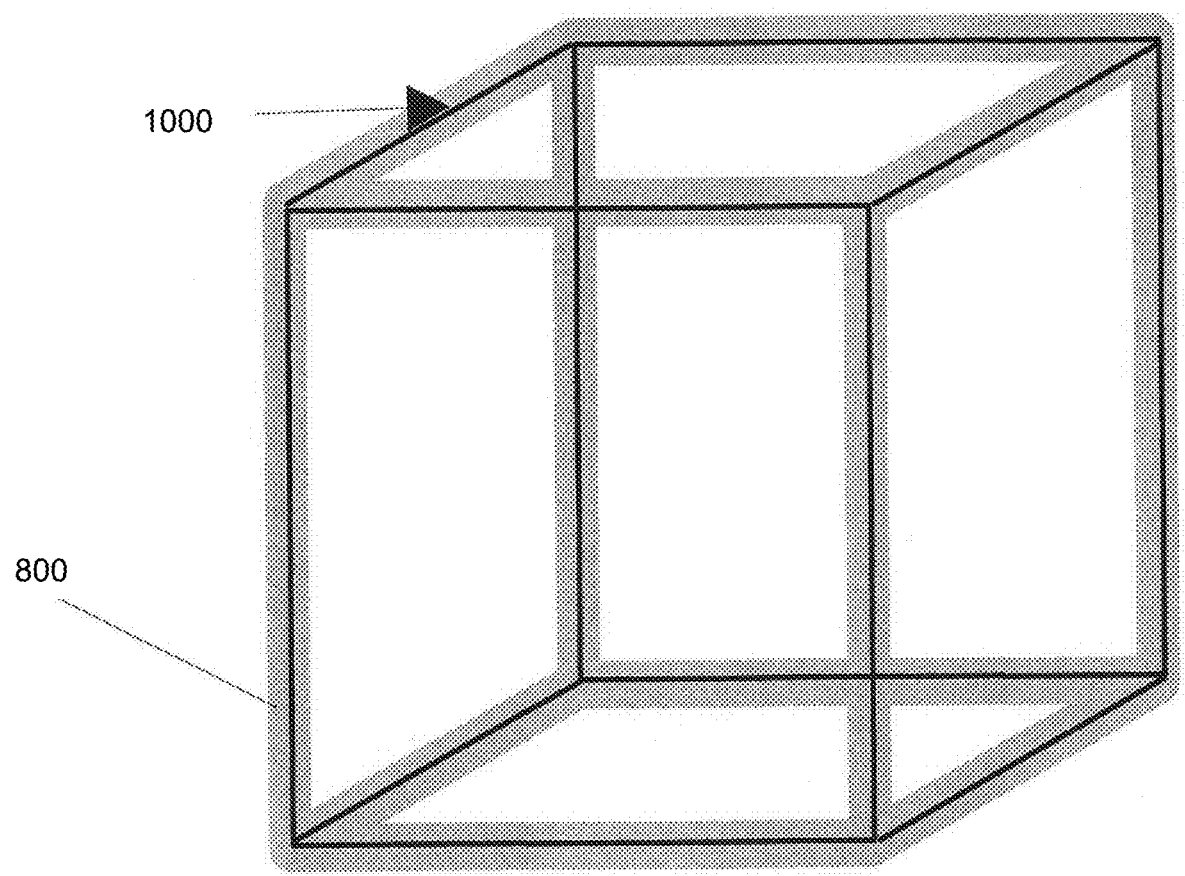
FIG. 12 is an isometric view of a visualization of a CT-scanned candidate component superimposed on the digital qualification data illustrating passing properties according to the qualification data, in accordance with the present disclosure.

FIG. 11 is an isometric view of the failing component 900 and the boundaries of the qualification data file 800. FIG. 12 is an isometric view of the passing component 1000 and the boundaries of the qualification data file 800.

Process Control

The comparative CT scanning process for determining that candidate physical components are like their traditionally qualified physical components must be controlled by a rigorous quality program, equivalent to that used for the traditional qualification of physical components. Control of the comparative CT process ensures that the comparative CT process gets consistent and repeatable results, and that the commercial grade item that has been qualified by comparative CT has the same level of assurance that it will be equivalent to the traditionally qualified physical component in fit and performance of its design function.

Controlled procedures for performing the scans must be prepared, reviewed and approved in accordance with a quality assurance program based on the same requirements as that used for the traditionally designed and manufactured physical components. Procedures must be specific to the CT scanners used and they are to be updated to address any physical chances to the CT scanner or to how it is operated.

Calibration of scanning equipment must be performed per the requirements of the CT scanner manufacturer in order to ensure the equipment performance necessary for the comparative CT process. Controlled procedures must be used for performance of the CT scanner calibrations. Records of calibrations performed must be maintained.

Equipment operating software used for CT scanning is typically provided by the manufacturer of the CT scanning equipment. Requirements for qualification of the CT scanner software is based upon the requirements of the quality program applied to the particular comparative CT scanning application. If the CT scanner software has been modified by the CT scanner owner, those same quality program requirements must be applied to the modified software.

As is the case for the equipment operating software, requirements for purpose-specific software used to establish the go/no-go baseline is based upon the requirements of the quality program applied to the particular comparative CT scanning application. If the go/no-go baseline software is subsequently modified, those same quality program requirements must be applied to the modified software.

Qualifications of CT scanner operators and scan data interpreters must be established and maintained per controlled procedures. For the CT scanner operators, records of associated scanner operations training and/or trial scan demonstrations will ensure that the operators are familiar with the proper operation of the specific types of equipment used for the CT scans. For the CT scan data interpreters, records of associated data interpretation training and/or trial data interpretation demonstrations will ensure that the scan data interpreters are familiar with the proper interpretation of the scan results from the specific CT scanners used and their associated software.

The baseline and comparison CT item records are quality records that document that the physical component is qualified. Controlled procedures describe record format and method of maintaining the comparative CT scan records. The records must be recoverable at any time during the time that the component is in inventory or in service. If comparative CT records are destroyed or otherwise unrecoverable, then the component is no longer considered qualified and it must be removed from service or inventory.

To facilitate an understanding of the principals and features of the disclosed technology, illustrative embodiments are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise.

By "comprising" or "containing" or "including" is meant that at least the named compound, element, particle, or method step is present in the composition or article or method, but does not exclude the presence of other components or method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. For example, one skilled in the art will recognize that executable instructions may be stored on a non-transient, computer-readable storage medium, such that when executed by one or more processors, causes the one or more processors to implement the method described above.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments of this technology are described above with reference to block and flow diagrams of computing devices and methods and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments of this disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

There is much that can be determined about the properties of CT scanned items (e.g.: dimensions, density, internal configurations, hidden defects, materials of construction, etc.), however, the comparative CT process is unique in that it uses the ability to determine dimensional and material properties to ensure that a commercial grade item is equivalent to a baseline sample of previously qualified items.

The system, methods, and apparatus disclosed are intended to prove part or component sameness (dimensional and materials). Instead of proving each item will individually meet the requirements of a specification, comparison CT scanning to a traditionally qualified baseline of already qualified items, confirms and documents likeness of equivalent commercial grade versions of the same items. After a baseline is established, easier to acquire (and less expensive) commercial grade items can be scanned, then qualified, based on being like the baseline items.

The invention claimed is:

1. A method of qualifying physical components using computed tomography (CT), the method comprising the steps of:
   obtaining, via a processor, qualified CT data from a CT scanner for at least one qualified physical component;
   generating, via the processor, qualification data based on the qualified CT data, where the qualification data defines a qualification envelope;
   obtaining, via the processor, candidate CT data from the CT scanner for a candidate physical component;
   generating, via the processor, comparison data based on the candidate CT data and the qualification data, where the comparison data indicates whether the candidate CT data is within the qualification envelope defined by the qualification data; and
   generating, via the processor, an acceptance signal if the comparison data meets acceptance criteria.

2. The method of claim 1, where the acceptance criteria requires that the entirety of the candidate CT data is within the qualification envelope defined by the qualification data.

3. The method of claim 1, where:
   the qualified CT data comprises a plurality of volumetric pixels (voxels);
   the qualification data comprises a plurality of voxels;

candidate CT data comprises a plurality of voxels; and
the comparison data comprises a plurality of voxels.

4. The method of claim 3, where each voxel comprises a three-dimensional (3D) location and material information.

5. The method of claim 4, where the at least one qualified physical component comprises a plurality of components; and
where the qualification data comprises a database of three-dimensional (3D) location and material information for each voxel of each of the pluralities' components.

6. The method of claim 5, where the material information comprises density information.

7. The method of claim 6, where the material information further comprises effective-atomic number (Zeff) information.

8. The method of claim 1, where generating comparison data further comprises the steps of:
aligning the voxels of the qualification data for each of the plurality of components;
generating an ordered list of recorded material readings from the plurality of components for each voxel; and
defining, via the processor, the qualification envelope for each voxel in the qualified CT data based on the ordered list.

9. The method of claim 8, where the ordered list is ordered based on the materials information.

10. The method of claim 8, where defining the qualification envelope further comprises the steps of:
establishing a conservatism factor based upon:
accuracy of positioning the physical component on CT scanner
accuracy of CT scanner and CT data
conservatism assigned to meet qualification process requirements of the candidate physical component end user; and
eliminating a subset of the ordered list of recorded material readings from the plurality of components for each voxel based on the conservatism factor.

11. The method of claim 8, further comprising the steps of:
obtaining at least one datum for the qualified CT data;
obtaining at least one datum for the candidate CT data; and
aligning the at least one datum for the candidate CT data with the at least one datum for the qualified CT data for the purpose of comparing dimensional and materials properties.

12. The method of claim 8, further comprising the step of correcting for physical component placement error.

13. The method of claim 11, where at least one datum for the qualified CT data and at least one datum for the candidate CT data, are based on a feature of the CT scanner.

14. The method of claim 13, where a feature of the CT scanner comprises radiopacity to determine material density.

15. The method of claim 11, further comprising the steps of:
generating, via the processor, at least one datum for the qualified CT data, based on the qualified CT data;
generating, via the processor, at least one datum for the candidate CT data based on candidate CT data; and
aligning, via the processor, the at least one datum for the candidate CT data with the at least one datum for the qualified CT data.

16. The method of claim 15, where generating a datum comprises identifying, via the processor, at least one edge condition in the CT data, where the edge condition in the CT data is associated with an edge in the physical component.

17. The method of claim 13, where the physical object is positioned in the scanner with a jig.

18. The method of claim 17, where the jig comprises the feature of the CT scanner.

19. The method of claim 1, where obtaining qualified CT data and obtaining candidate CT data comprise scanning the at least one qualified physical component and the candidate physical components with X-rays of multiple energy levels; and calculating an effective-atomic number (Zeff) for each voxel.

20. A system for qualifying physical components using computed tomography (CT) comprising:
a CT scanner,
a processor operatively connected to the CT scanner; and
non-transient memory operatively connected to the processor, the memory comprising instruction which cause the processor to execute a method comprising the steps of:
obtaining, via a processor, qualified CT data from a CT scanner for at least one qualified physical component;
generating, via the processor, qualification data based on the qualified CT data, where the qualification data defines a qualification envelope:
obtaining, via the processor, candidate CT data from the CT scanner for a candidate physical component;
generating, via the processor, comparison data based on the candidate CT data and the qualification data, where the comparison data indicates whether the candidate CT data is within the qualification envelope defined by the qualification data; and
generating, via the processor, an acceptance signal if the comparison data meets acceptance criteria.

* * * * *